July 26, 1960     H. M. CONVERSANO     2,946,982
POP-UP SIGNAL DEVICES IN INSTRUMENT PANELS
Filed Dec. 16, 1957
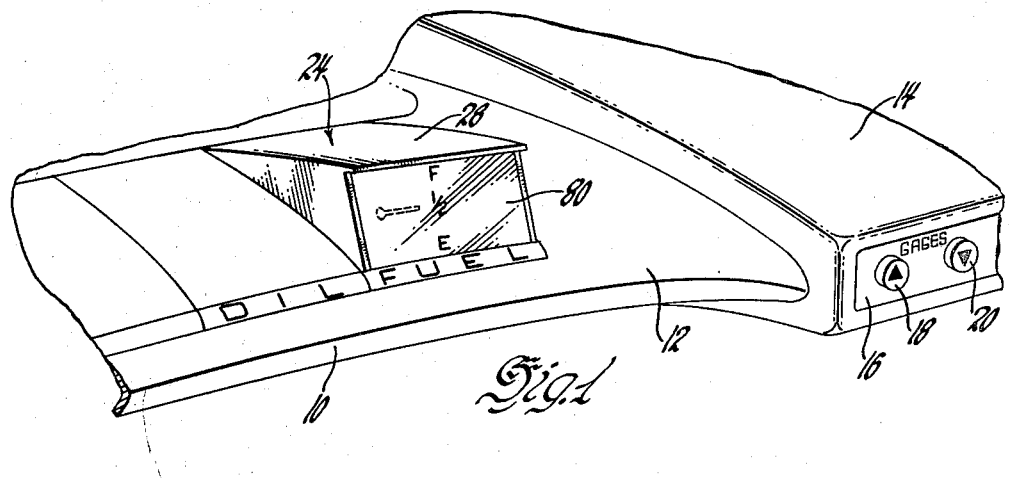
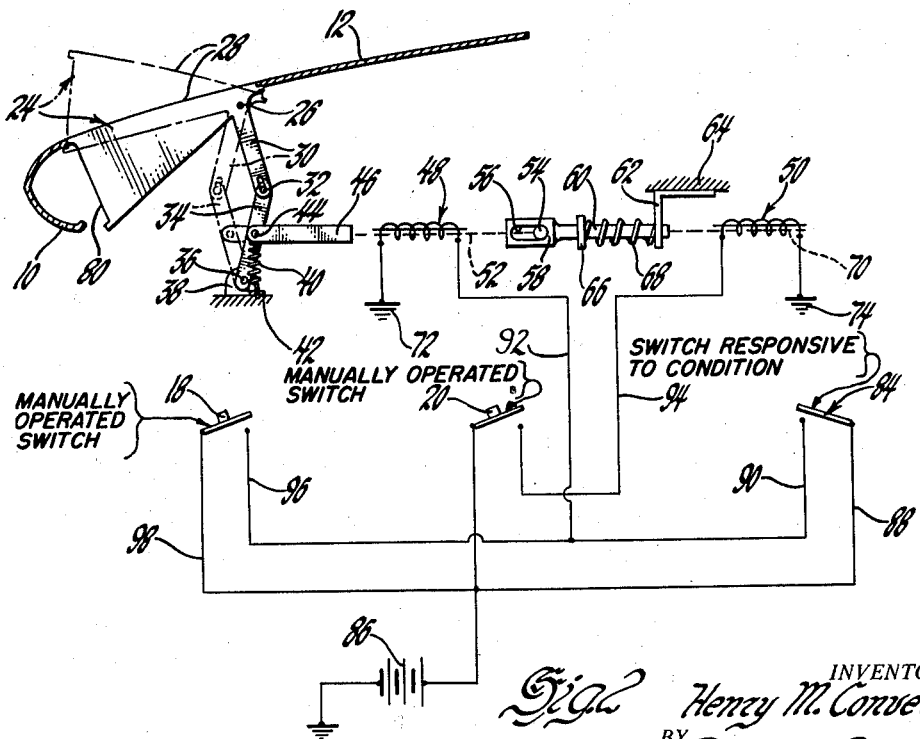
INVENTOR.
*Henry M. Conversano*
BY
*J. W. Lovett*
ATTORNEY

United States Patent Office 2,946,982
Patented July 26, 1960

2,946,982
POP-UP SIGNAL DEVICES IN INSTRUMENT PANELS

Henry M. Conversano, El Paso, Tex., assignor to General Motors Corporation, Detroit, Mich., a corporation of Delaware Filed Dec. 16, 1957, Ser. No. 702,875

3 Claims. (Cl. 340—52)

This invention relates to signal devices and particularly to indicating instruments such as gauges of the type employed in the instrument panels of automotive vehicles.

Gauges for indicating pressures, quantities, distances and other values are arranged in instrument panels on vehicles in such positions that they are normally and conveniently in view of the vehicle operators. Being open to view, such a gauge is not easily padded to prevent its contact with the person of a vehicle passenger and injuring him in the event of a traffic accident or sudden vehicle stop. Also, if the value of the reading of a given gauge suddenly becomes critical such as low fuel level or no oil pressure, reliance has heretofore been placed on a sound, color or light effect to signal or warn the operator.

An object of the present invention is to provide an improved signal device and panel combination which may be fully crash-padded and, at the same time, be capable of imparting a signal or warning to the operator when a given predetermined condition obtains. Another object is to provide a signal device such as a gauge in a panel and which is normally concealed for safety or aesthetic purposes but sibject to be viewed when a reading is desired or when a warning should automatically be given the operator.

To these ends, a feature of the invention is a normally concealed indicating instrument controlled by some condition such as a predetermined liquid level automatically to come into view of the operator when that condition is attained. Another feature is a device normally concealed but available to serve as a gauge and effective to serve the operator as a warning to him by its bodily movement when an abnormal condition obtains.

These and other important features of the invention will now be described in detail in the specification and then pointed out more particularly in the appended claims, In the drawings:

Fig. 1 shows a perspective view of a portion of a vehicle instrument panel in which is mounted a device in position given a reading as to the fuel supply, the combination of panel and instrument embodying features of the present invention; and Fig. 2 presents a diagrammatic view of the instrument or device shown in Fig. 1 with its normal position illustrated in full lines and its service position in dot-and-dash lines, a section of the instrument panel and a diagrammatic representation of electrical circuitry being involved.

In the drawings, an instrument panel 10 suitable for use in an automotive vehicle is partially illustrated and shown to possess a somewhat horizontal or downwardly inclined surface 12. This panel is not illustrated as being padded, but obviously a protective padding may be placed thereon preventing possible unyielding contact of metal with the persons of individuals riding in the car. The panel 10 is illustrated as possessing an enlarged portion 14 in which is mounted a sub-panel 16 having two switch control knobs 18 and 20. The switches themselves are conventional.

A fuel gauge 24 having a wedge-like casing is pivotally supported as at 26 within the contour lines of the panel 10 and the upper surface 28 of the instrument is formed normally to merge with the upper surface of the instrument panel. Fig. 1 shows the instrument protruding upwardly from the surface 12 of the panel. This is an abnormal or service position of the gauge as will further appear.

Depending from the casing of the instrument is an arm 30 having a slotted pin connection 32 with the upper end of a second arm 34. The bottom end of the arm 34 is pivotally supported as at 36 to a fixed portion of the vehicle such as the portion 38. A coil spring 40 has one end connected as at 42 to a fixed portion of the vehicle and its other end connected to a pin 44 midway the length of the arm 34. Fig. 2 makes it apparent that the arms 30 and 34 constitute a toggle mechanism actuatable into two positions, each beyond dead center, with the aid of the spring 40. The pin 44 also serves as a pivoted connection with one end of a link 46 which may be operated by two solenoid arrangements 48 and 50. The solenoid arrangement 48 is provided with an armature 52 which connects the link 46 with a transverse pin 54. The latter is slidable in a slot 56 formed in a block 58 which in turn is fixed to one end of a rod 60. The latter is slidable longitudinally and is supported by a right angle member 62 fixed to a stationary part 64 of the vehicle. The rod 60 has a shoulder portion 66 and a spring 68 is positioned on the rod between the shoulder portion 66 and the angle bar 62. Fixed to the other end of the rod 60 is an armature 70 of the solenoid arrangement 50. The coil of the armature arrangement 48 is grounded as at 72 and the coil of the armature arrangement 50 is grounded as at 74. The arrangement of the solenoids and links 46 and 60 is such that the link 46 may be moved independently of the rod 60 because of the loose motion connection represented by the block 58 and the pin 54.

It will be appreciated that details of the gauge or instrument 24 per se is such as to indicate on its face 80 some means, such as symbols, for showing the level of fuel in the gasoline tank of the vehicle. A fuel gauge of this conventional type but with a different casing is illustrated in the United States Patent 2,181,960 granted December 5, 1939, in the name of B. F. Bacon.

Such an instrument, providing it is positioned for view, is capable of giving a reading or indication of the condition of the fuel supply as determined by a float in the gasoline tank at any time. The particular details involved in that phase of the instrument are of no moment insofar as the present invention is concerned. The arrangement should be such, however, that when a predetermined low fuel level is attained a switch indicated at 84 will be closed completing a circuit involving a source of current such as the battery 86 and lines 88, 90 and 92 leading to the coil of the solenoid arrangement 48. This switch is in addition to the usual resistance employed to give service readings of the gauge on its face 80.

One end of the coil in the solenoid arrangement 50 is connected by a line 94 to the battery 86 by way of the switch actuated by the knob 20. Lines 96 and 98 are also provided by means of which the coil of the solenoid arrangement 48 may be connected to the battery 86 by a switch actuated by the manually operated knob 18.

Under normal operating conditions the gauge 24 is at least partially concealed by the instrument panel 10 for it is received within the panel with its open surface conforming to the latter to present a pleasing appearance. If, during normal operation of the vehicle, the operator desires to investigate as to the condition of the fuel supply, he will manually close the switch of knob 18 thereby energizing the solenoid arrangement 48 with the result that the toggle mechanism will assume the position shown in dot-and-dash lines in Fig. 2. The face 80 of the instrument will then be clearly observable by the operator. After obtaining his reading, the operator then presses the switch knob 20 with the result that the solenoid arrangement 50 is energized to actuate the toggle arrangement and retract or pull down the instrument into its normal position. The spring 40, of course, serves to retain the instrument in either position until overcome by the solenoid arrangement 48 or 50.

In the event an abnormal and predetermined condition such as low fuel level is attained and the gauge is in its normal concealed position, the switch 84 will automatically be closed thereby energizing the solenoid arrangement 48 and causing the instrument to pop up. This action or bodily movement of the entire instrument serves as a forceful warning signal indicating that the critical or predetermined condition has been reached.

From the above, it may be seen that the arrangement is such that, under normal operating conditions, the instrument panel is not marred or its aesthetic appearance reduced because of the gauge and, at the same time, the gauge is readily available when its use is desired; and an additional function is performed in that the pop-up action serves as a warning signal regarding some predetermined condition which may or may not relate to the value indicated on the gauge face 80. Obviously, the gauge 24 may be an engine temperature gauge and may automatically pop up when the engine oil pressure is low. Preferably, however, the gauge and pop-up feature should relate to only one condition such as fuel supply which is taken merely as an example.

I claim:

1. A signal device comprising an indicating instrument in combination with an instrument panel and pivotally mounted within the latter, a first side of said instrument being in substantial conformity with the contour of said panel, a second side of said instrument being concealed by said panel and presenting indicating means representing the instrument reading, and actuating means connected to said instrument and influenced by an external condition whereby said indicating instrument may be pivoted to reveal said second side to an observer.

2. A signal device comprising the combination of an indicating instrument movable on a pivot within an instrument panel as set forth in claim 1, the said first side of said instrument having a surface contour in substantial conformity with a top exterior surface of said instrument panel, and the said second side of said instrument lying in a plane extending transverse to said top exterior surface and spaced from said pivot whereby a substantial up and down movement may be imparted to said second side.

3. A signal device comprising the combination of an indicating instrument and an instrument panel as set forth in claim 1, the said instrument being recessed in a top surface of said panel, said actuating means including electrically operated mechanism connected to said instrument for pivotally moving the latter in a vertical plane and with relation to said panel, and the arrangement being such that said second side may be concealed and revealed in a view from a horizontal direction by selective actuation of said mechanism.

References Cited in the file of this patent

UNITED STATES PATENTS

| | | |
|---|---|---|
| 506,582 | Brown | Oct. 10, 1893 |
| 1,215,155 | Hosford | Feb. 6, 1917 |
| 1,651,238 | Wood | Nov. 29, 1927 |
| 2,013,241 | Hefner | Sept. 3, 1935 |
| 2,144,813 | Roan et al. | Jan. 24, 1939 |
| 2,435,907 | Schirokauer | Feb. 10, 1948 |
| 2,652,557 | Durant | Sept. 15, 1953 |
| 2,800,640 | Hebar et al. | July 23, 1957 |